United States Patent
Ryu et al.

(10) Patent No.: US 9,451,644 B2
(45) Date of Patent: Sep. 20, 2016

(54) METHOD AND APPARATUS OF UPLINK SET-UP IN A WIRELESS COMMUNICATION SYSTEM

(71) Applicant: LG ELECTRONICS INC., Seoul (KR)

(72) Inventors: Kiseon Ryu, Anyang-si (KR); Jinsam Kwak, Anyang-si (KR); Giwon Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 14/380,671

(22) PCT Filed: Mar. 29, 2013

(86) PCT No.: PCT/KR2013/002633
§ 371 (c)(1),
(2) Date: Aug. 22, 2014

(87) PCT Pub. No.: WO2013/147546
PCT Pub. Date: Oct. 3, 2013

(65) Prior Publication Data
US 2015/0305069 A1    Oct. 22, 2015

Related U.S. Application Data

(60) Provisional application No. 61/617,052, filed on Mar. 29, 2012, provisional application No. 61/617,058, filed on Mar. 29, 2012, provisional application No. 61/619,422, filed on Apr. 3, 2012.

(51) Int. Cl.
*H04W 76/02*    (2009.01)
*H04W 48/16*    (2009.01)
(Continued)

(52) U.S. Cl.
CPC ............. *H04W 76/02* (2013.01); *H04W 48/16* (2013.01); *H04W 72/0446* (2013.01); *H04W 48/12* (2013.01); *H04W 56/001* (2013.01); *H04W 74/006* (2013.01); *H04W 88/08* (2013.01)

(58) Field of Classification Search
CPC ...................................... H04W 76/02
USPC ................. 370/336, 338, 311, 328
See application file for complete search history.

(56) References Cited

U.S. PATENT DOCUMENTS 7,457,973 B2 * 11/2008 Liu ................... H04W 52/0216
                                                          370/229
8,401,018 B2 *  3/2013 Meylan ................... H04L 47/14
                                                          370/395.4

(Continued)

FOREIGN PATENT DOCUMENTS

KR    10-2009-0011260       2/2009
KR    10-2009-0132650      12/2009

OTHER PUBLICATIONS

Velayos, et al., "Techniques to reduce the IEEE 802.11b handoff time," 2010, 3 pages.

(Continued)

*Primary Examiner* — Andrew Lai
*Assistant Examiner* — Andrew C Lee
(74) *Attorney, Agent, or Firm* — Lee, Hong, Degerman, Kang & Waimey; Jonathan Kang; Richard Salfelder (57) ABSTRACT

The present invention is directed to a wireless communication system. Specifically, the present invention is directed to a method of performing a procedure for link-setup and an apparatus therefore, wherein the method comprises: receiving a probe request frame including time information via a channel, wherein the time information indicates at least one of a minimum scan time for the channel and a maximum scan time for the channel; and performing a procedure for transmitting a probe response frame after receipt of the probe request frame, wherein if a beacon transmission time occurs within a time given based on the time information, transmission of the probe response frame is omitted.

10 Claims, 8 Drawing Sheets

(51) Int. Cl.
*H04W 72/04* (2009.01)
*H04W 56/00* (2009.01)
*H04W 48/12* (2009.01)
*H04W 74/00* (2009.01)
*H04W 88/08* (2009.01)

(56) References Cited

U.S. PATENT DOCUMENTS

| | | | | |
|---|---|---|---|---|
| 8,483,105 | B2 * | 7/2013 | Nanda | H04L 29/06068 370/278 |
| 8,717,923 | B2 * | 5/2014 | Vedantham | H04L 1/1854 370/252 |
| 8,848,730 | B1 * | 9/2014 | Vleugels | H04W 8/005 370/304 |
| 9,057,771 | B2 * | 6/2015 | Giustiniano | H04W 64/00 |
| 2002/0025810 | A1 * | 2/2002 | Takayama | H04W 48/20 455/432.1 |
| 2002/0154653 | A1 * | 10/2002 | Benveniste | H04L 12/4013 370/447 |
| 2002/0163933 | A1 * | 11/2002 | Benveniste | H04L 47/10 370/465 |
| 2003/0210658 | A1 * | 11/2003 | Hernandez | H04W 52/0232 370/311 |
| 2004/0137905 | A1 * | 7/2004 | Jeong | H04W 48/16 455/450 |
| 2005/0058151 | A1 * | 3/2005 | Yeh | H04W 52/46 370/445 |
| 2006/0111103 | A1 * | 5/2006 | Jeong | H04W 48/14 455/434 |
| 2006/0159041 | A1 * | 7/2006 | Zhun | H04W 74/0808 370/328 |
| 2007/0133448 | A1 * | 6/2007 | Gao | H04W 52/0216 370/311 |
| 2008/0008121 | A1 * | 1/2008 | Alizadeh-Shabdiz | G01S 5/02 370/328 |
| 2008/0014934 | A1 * | 1/2008 | Balasubramanian | H04W 48/16 455/434 |
| 2008/0064404 | A1 * | 3/2008 | Zhang | H04W 36/08 455/436 |
| 2008/0102852 | A1 * | 5/2008 | Du | H04W 48/20 455/453 |
| 2010/0002659 | A1 * | 1/2010 | Doi | H04B 7/2696 370/338 |
| 2010/0039974 | A1 * | 2/2010 | Toshimitsu | H04W 52/0225 370/311 |
| 2010/0150118 | A1 * | 6/2010 | Daum | H04L 5/0082 370/338 |
| 2011/0038357 | A1 * | 2/2011 | Gong | H04W 48/16 370/338 |
| 2011/0096732 | A1 * | 4/2011 | Rashid | H04L 47/10 370/329 |
| 2011/0191473 | A1 * | 8/2011 | Sakai | H04W 8/005 709/224 |
| 2011/0243013 | A1 * | 10/2011 | Lee | H04W 24/10 370/252 |
| 2013/0039181 | A1 * | 2/2013 | Chao | H04W 48/16 370/235 |
| 2013/0107756 | A1 * | 5/2013 | Lai | H04W 48/16 370/255 |
| 2013/0231151 | A1 * | 9/2013 | Kneckt | H04W 40/246 455/515 |
| 2013/0237216 | A1 * | 9/2013 | Ong | H04W 24/10 455/434 |

OTHER PUBLICATIONS

PCT International Application No. PCT/KR2013/002633, Written Opinion of the International Searching Authority dated Jul. 1, 2013, 1 page.

* cited by examiner

METHOD AND APPARATUS OF UPLINK SET-UP IN A WIRELESS COMMUNICATION SYSTEM

CROSS-REFERENCE TO RELATED APPLICATIONS

This application is the National Stage filing under 35 U.S.C. 371 of International Application No. PCT/KR2013/002633, filed on Mar. 29, 2013, which claims the benefit of U.S. Provisional Application Ser. No. 61/617,052, filed on Mar. 29, 2012, 61/617,058, filed on Mar. 29, 2012 and 61/619,422, filed on Apr. 3, 2012, the contents of which are all hereby incorporated by reference herein in their entirety.

TECHNICAL FIELD

The present invention is directed to a method and an apparatus for being used in a wireless communication system (e.g., a wireless local area network (WLAN)). Specifically, the present invention is directed to a method and an apparatus of scanning channels.

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). The multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and any combination thereof.

DISCLOSURE

Technical Problem

An object of the present invention is to provide a method and an apparatus of efficiently scanning channels in a wireless communication system. The wireless communication system can provide M2M services, and the network congestion/access may be for the M2M services.

It will be appreciated by persons skilled in the art that the objects that can be achieved through the present invention are not limited to what have been particularly described hereinabove and the above and other objects that the present invention can achieve will be more clearly understood from the following detailed description taken in conjunction with the accompanying drawings.

Technical Solution

As an aspect of the invention, a method of performing a procedure for link-setup at an access point in a wireless communication system is provided. The method comprises: receiving a probe request frame including time information via a channel, wherein the time information indicates at least one of a minimum scan time for the channel and a maximum scan time for the channel; and performing a procedure for transmitting a probe response frame after receipt of the probe request frame, wherein if a beacon transmission time occurs within a time given based on the time information, transmission of the probe response frame is omitted.

As another aspect of the invention, an access point for used in a wireless communication system is provided. The access point comprises: a radio frequency unit; and a processor, wherein the processor is configured to: receive a probe request frame including time information via a channel, wherein the time information indicates at least one of a minimum scan time for the channel and a maximum scan time for the channel; perform a procedure for transmitting a probe response frame after receipt of the probe request frame; wherein if a beacon transmission time occurs within a time given based on the time information, transmission of the probe response frame is omitted.

Preferably, if the beacon transmission time occurs within the time, a beacon may be transmitted at the beacon transmission time.

Preferably, if the beacon transmission time does not occur within the time, the probe response frame may be transmitted in response to the probe request frame.

Preferably, the time may be given as being the minimum scan time for the channel.

Preferably, the time may be given as being the maximum scan time for the channel.

Preferably, the time may be given as a first time based on the minimum scan time for the channel, and if there is a signal detection within the first time, the time may be extended to a second time based on the maximum scan time, wherein the second time may be longer than the first time.

Preferably, wherein the time is given as a first time based on the minimum scan time for the channel, and if a medium access control (MAC) frame responding to the probe request frame is received from another access point within the first time, the time is extended to a second time based on the maximum scan time, wherein the second time is longer than the first time.

Advantageous Effects

Exemplary embodiments of the present invention have the following effects. In accordance with the embodiments of the present invention, a procedure for scanning channels can be efficiently performed in a wireless communication system.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE.

Although the following embodiments of the present invention will hereinafter describe inventive technical characteristics on the basis of the IEEE 802.11 system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
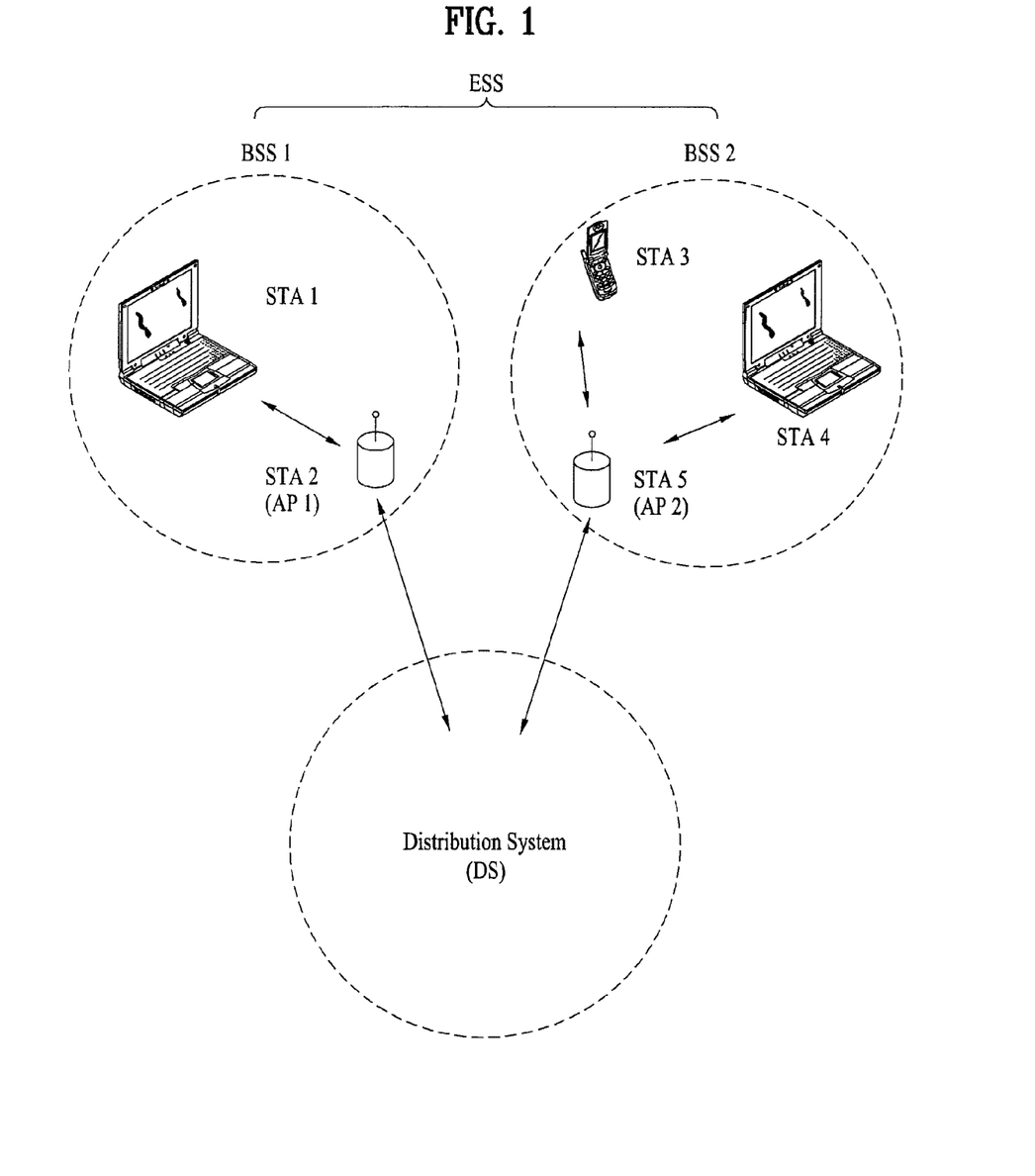
FIG. 1 shows an exemplary structure of a wireless local area network (WLAN) system.

FIG. 1 shows an exemplary structure of a WLAN system.

Referring to FIG. 1, a WLAN system such as the WLAN system includes one or more Basis Service Sets (BSSs). The BSS is a set of stations (STAs) which are successfully synchronized to communicate with one another, and is not a concept indicating a specific region. The BSS can be classified into an infrastructure BSS and an Independent BSS (IBSS). The infrastructure BSS is shown in FIG. 1. Infrastructure BSSs (i.e., BSS1 and BSS2) include one or more non-Access Point (AP) STAs (i.e., Non-AP STA1, Non-AP STA3, and Non-AP STA4), AP STAs (i.e., AP STA1 and AP STA2) which are STAs providing a distribution service, and a distribution system (DS) connecting the plurality of AP STAs (i.e., AP STA1 and AP STA2). In the infrastructure BSS, an AP STA manages non-AP STAs of the BSS.

Meanwhile, the IBSS is a BSS operating in an ad-hoc mode. Since the IBSS does not include the AP, a centralized management entity for performing a management function in a centralized manner does not exist. That is, the IBSS manages the non-AP STAs in a distributed manner. In addition, in the IBSS, all STAs may consist of mobile STAs, and a self-contained network is configured since access to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a functional trait devised to transmit and receive a frame for the STAs through the wireless network. Among the STAs, non-AP STAs (i.e., STA1, STA3, STA4, and STA5) are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc.

The AP (i.e., AP1 and AP2) is a functional entity for providing access to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS) a site controller, etc.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby an AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

Figure 2:
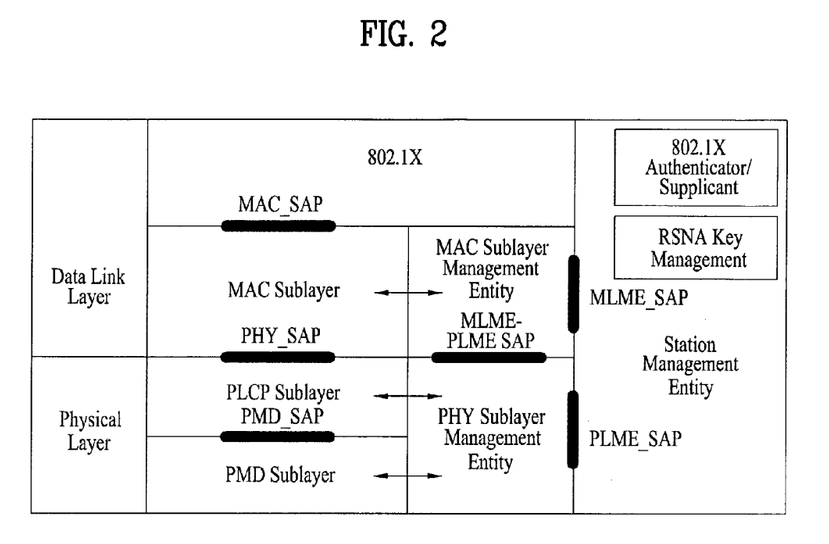
FIG. 2 shows a reference model of a WLAN protocol.

FIG. 2 shows a reference model of a WLAN protocol.

With reference to FIG. 2, the reference protocol model of a station is separated to two major parts: Medium Access Control layer (MAC) of Data Link Layer (DLL) and Physical layer (PHY). These layers are intended to correspond closely to the lowest layers of Open Systems Interconnection (OSI) reference model. The MAC includes a MAC sublayer and a MAC sublayer management entity (MLME). The PHY includes a Physical Layer Convergence Procedure (PLCP) sublayer, a Physical Medium Dependent (PMD) sublayer and a PHY sublayer management entity. Both the MAC sublayer and PHY conceptually include management entities, called MAC Layer Management Entity (MLME) and Physical Layer Management Entity (PLME), respectively. In order to provide correct MAC operation, a Station Management Entity (SME) is present within each STA. The SME is a layer-independent entity that resides in a separate management plane or resides "off to the side." The various entities within this model interact in various ways. For these interactions, primitives are exchanged via a Service Access Point (SAP) between MLME, PLME and SME.

To access a network, an STA performs a procedure of searching a network the STA can join. Before joining the network, the STA must identify a compatible network, and the process of identifying a network present in a particular area is called scanning.

Figure 3:
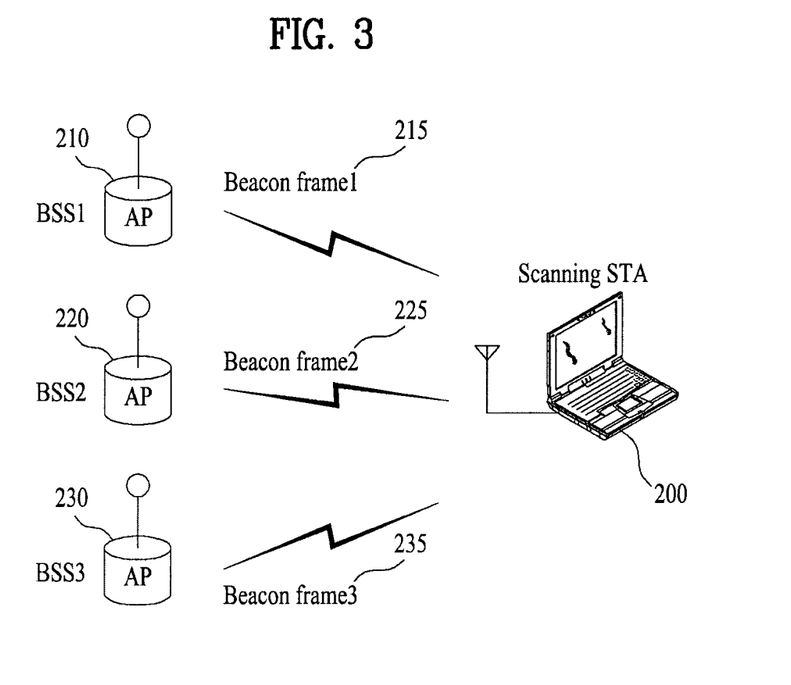
FIG. 3 shows an example of a passive scanning procedure.

Table 1 shows parameters for the scanning procedure. The parameters may be parameters of a MLME-SCAN.request primitive. The MLME-SCAN.request primitive requests a survey of potential BSSs that the STA can later elect to try to join. The MLME-SCAN.request primitive is generated by the SME for the STA to determine if there are other BSSs that it can join. When the MLME receives the MLME-SCAN.request primitive, scan procedure may be initiated.

a beacon frame 215 transmitted by an AP1 210 of a BSS1 and a beacon frame 225 transmitted by an AP2 220 of a BSS2, but not a beacon frame 235 transmitted by an AP3 230 of a BSS3, the scanning STA 200 performs buffering that the two BSSs (BSS1 and BSS2) have been discovered from a current channel and moves to another channel. Repeatedly performing this process, the scanning STA 200 performs scanning on every channel on a channel list.

Figure 4:
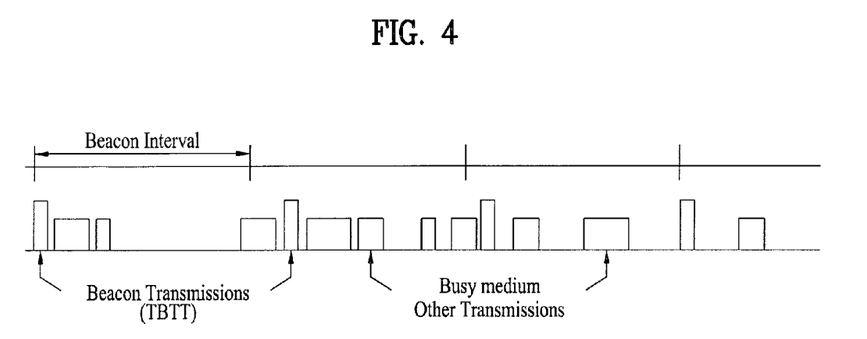
FIG. 4 shows an example of beacon transmission

FIG. 4 shows an example of beacon transmission.

Referring to FIG. 4, an AP may define timings for the entire BSS by transmitting Beacon frames according to a Beacon Period. The timings define a series of Target Beacon Transmission Times (TBTTs) which are apart from each other by a Beacon Period TUs. At each TBTT, the AP schedules a Beacon frame as the next frame for transmission. The beacon period may be included in Beacon and Probe Response frames, and a STA may adopt that beacon

TABLE 1

| Name | Type | Valid range | Description |
| --- | --- | --- | --- |
| BSSType | Enumeration | INFRASTRUCTURE, INDEPENDENT, ANY_BSS | Determines whether infrastructure BSS, IBSS, or both, are included in the scan. |
| BSSID | MACAddress | Any valid individual or broadcast MAC address | Identifies a specific or wildcard BSSID. |
| SSID | Octet string | 0-32 octets | Specifies the desired SSID or the wildcard SSID. |
| ScanType | Enumeration | ACTIVE, PASSIVE | Indicates either active or passive scanning. |
| ProbeDelay | Integer | N/A | Delay (in microseconds) to be used prior to transmitting a Probe frame during active scanning. |
| ChannelList | Ordered set of integers | Each channel will be selected from the valid channel range for the appropriate PHY and carrier set. | Specifies a list of channels that are examined when scanning for a BSS. |
| MinChannelTime | Integer | ≥ProbeDelay | The minimum time (in TU) to spend on each channel when scanning |
| MaxChannelTime | Integer | ≥MinChannelTime | The maximum time (in TU) to spend on each channel when scanning |
| VendorSpecificInfo | A set of information elements | | Zero or more information elements. |

The STA scans a network that can be accessible according to the parameter values of Table 1, and in this case, the STA performs scanning in an active scanning scheme or a passive scanning scheme according to a ScanType parameter value in Table 1.

FIG. 3 shows an example of a passive scanning procedure. In the passive scanning procedure, a scanning STA waits for a beacon frame while monitoring each channel on a channel list. The channel list specifies a list of channels that are examined when scanning for a BSS. The beacon frame, one of management frames in IEEE 802.11, is periodically transmitted to inform about the presence of a wireless network, to announce the beginning of a Contention Free (CF) period, and to allow the scanning STA to search for the wireless network to join it. In an infrastructure network, an AP transmits the beacon frame, and in the IBSS, STAs within the IBSS transmit the beacon frame by turns.

When the scanning STA receives the beacon frame, it buffers the beacon frame to acquire information about a BSS, and records the beacon frame information in each channel while moving to the channels.

With reference to FIG. 3, a scanning STA 200 performs channel scanning in a particular channel according to the passive scanning scheme. If the scanning STA 200 receives period when joining the BSS. In case of a busy network, the transmission of a Beacon frame may be delayed because of Carrier Sense Multiple Access (CSMA) deferrals, but subsequent Beacon frames are scheduled at the un-delayed nominal beacon interval.

Figure 5:
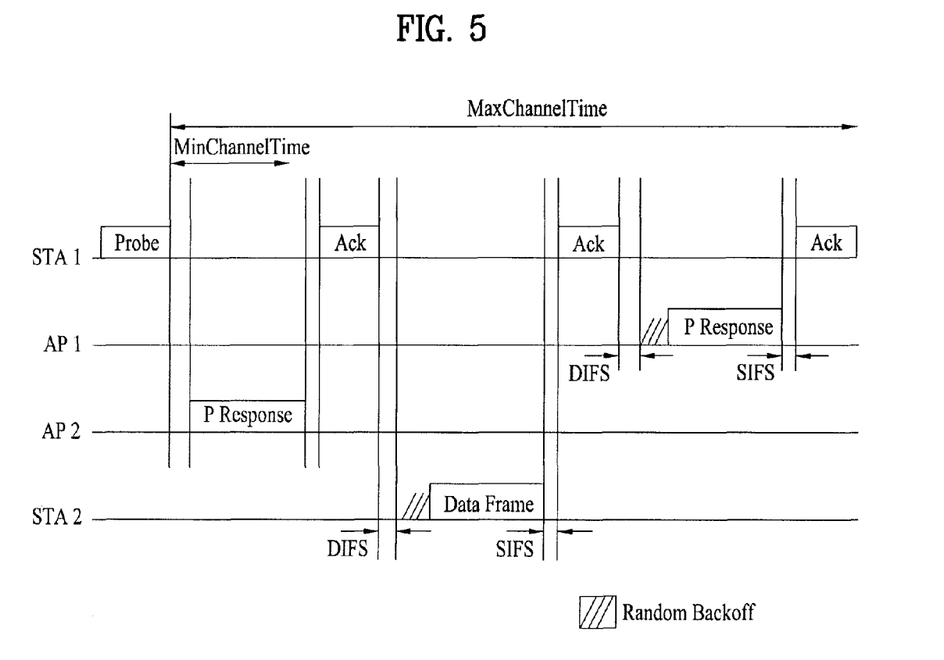
FIG. 5 shows an example of an active scanning procedure.

FIG. 5 shows an example of an active scanning procedure. Upon receipt of the MLME-SCAN.request primitive (see, Table 1) with ScanType indicating an active scan, a STA may perform following operations, for each channel to be scanned:

Send a probe request (Probe) with Service Set Identifier (SSID) and Basic Service Set Identifier (BSSID). The SSID and BSSID are obtained from the MLME-SCAN.request primitive. When the SSID List is present in the MLME-SCAN.request primitive, send one or more probe request frames, each with an SSID indicated in the SSID List and the BSSID from the MLME-SCAN.request primitive. Probe request is used to actively seek any, or a particular, access point or BSS.

Set a timer (e.g., ProbeTimer) to 0 and start the timer.

If PHY-CCA.indication (busy) primitive has not been detected before the timer reaches a minimum scan time or a minimum channel time (MinChannelTime), then set Network Allocation Vector (NAV) to 0 and scan the next channel, else when the timer reaches a maximum scan time or a maximum channel time (MaxChannelTime), process all received probe responses (P Responses). The PHY-CCA.indication primitive is an indication by a PHY to the local MAC of the current state (e.g., busy or not) of a Wireless Medium (WM) or a Radio Frequency (RF) medium. The PHY-CCA.indication primitive is generated by the PHY when the PHY is receiving RF energy from any source that exceeds a threshold parameter. In particular, the PHY-CCA.indication primitive is generated by the PMD, and indicates to the PLCP layer that the receiver has detected RF energy in accordance with Clear Channel Assessment (CCA) algorithm. The NAV is an indicator of time periods when transmission onto the WM is not initiated by the STA regardless of whether the STA's CCA function senses that the WM is busy. The NAV is maintained by each STA.

Set NAV to 0 and scan the next channel.

When all channels in the ChannelList have been scanned, the MLME may issue an MLME-SCAN.confirm primitive with the BSSDescriptionSet containing all of the information gathered during the scan. The MLME-SCAN.confirm primitive is used to return descriptions of the set of BSSs detected by the scan process to the SME. The MLME-SCAN.confirm primitive is generated by the MLME as a result of an MLME-SCAN.request primitive to ascertain the operating environment of the STA. The MLME-SCAN.confirm primitive notifies the SME of the results of the scan procedure.

EXAMPLE

Fast Initial Link Setup (FILS) procedures have been discussed in IEEE 802.11. In According to the discussions, an AP (e.g. FILS capable AP) may omit transmission of Probe Response frame to STAs (e.g., FILS capable STAs) if the TBTT occurs within a predefined time interval.

In this regard, as mentioned in the active scanning, if PHY-CCA.indication (busy) primitive has not been detected before the ProbeTimer reaches MinChannelTime, STA scans the next channel, else when ProbeTimer reaches MaxChannelTime, process all received probe responses. Thus, it may be advantageous to use MinChannelTime and/or MaxChannelTime in order to set the predefined time interval. But, the MinChannelTime and/or the MaxChannelTime are a primitive of MLME-SCAN.request, so these values are only known to a STA locally. Thus, an AP cannot know the MinChannelTime and/or the MaxChannelTime, accordingly cannot use these values to set the predefined time interval.

In order to address the problems, it is proposed that an STA may inform an AP of when the STA is available to receive a Probe Response frame or a Beacon frame. For this end, STA(s) and AP(s) may exchange time information related with when the STA is available to receive a Probe Response frame or a Beacon frame. The proposed time information may be included in a Probe Request Frame. The proposed time information may include, not to limited to these, information related with a minimum scan time (or, a minimum channel time) for a channel and/or a maximum scan time (or a maximum channel time) for the channel. For example, the proposed time information may include at least one of MinChannelTime and MaxChannelTime. Also, the proposed time information may include value(s) related with at least one of MinChannelTime and MaxChannelTime. Also, the proposed time information may include value(s) calculated by using at least one of MinChannelTime and MaxChannelTime.

Figure 6:
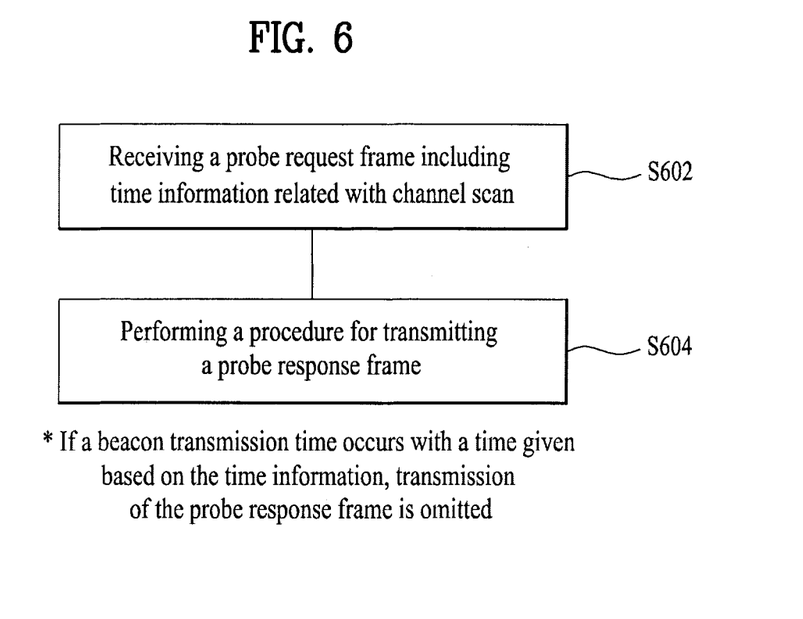
FIG. 6 shows an example of scan procedure for link-setup according to the present invention.

FIG. 6 shows an example of scan procedure for link-setup according to the present invention. For convenience, FIG. 6 is focused on some AP operations among overall link-setup procedure. Detailed operations can be referred to FIGS. 3-5.

With reference to FIG. 6, an AP may receive, from an STA, a probe request frame including time information related with a channel scan via a channel (S602). The time information related with the channel scan includes information related with at least one of a minimum scan time for the channel and a maximum scan time for the channel. A scan time may be replaced with a channel time, a channel scan time, and the like. The time information related with a channel scan may include at least one of MinChannelTime and MaxChannelTime; value(s) related with at least one or MinChannelTime and MaxChannelTime; or value(s) calculated by using at least one or MinChannelTime and MaxChannelTime. Preferably the time information related with a channel scan may include MinChannelTime; a value related with MinChannelTime; or a value calculated by using MinChannelTime.

After receiving the probe request frame, the AP may perform a procedure for transmitting a probe response frame (S604). The procedure for transmitting the probe response frame includes generating the probe response frame, allocating radio resources (e.g., time-frequency resources) to the probe response frame.

In the present example, if a beacon transmission time occurs within a specific time given based on the time information related with channel scan, transmission of the probe response frame may be omitted. Transmission of the probe response frame may be omitted for example by not generating the probe response, by not allocating radio resources for the probe response, or by dropping transmission of the probe response. In addition, if the beacon transmission time occurs within the specific time, a beacon is transmitted at the beacon transmission time. Meanwhile, if the beacon transmission time does not occur within the specific time, the probe response frame may be transmitted in response to the probe request frame.

The specific time may be determined based on the time information related with the channel scan in a various way. For example, as 1st option, the specific time may be set to the minimum scan time (e.g., MinChannelTime of MLME-SCAN.request) for the channel, or a value related thereto. As 2nd option, the specific time may be set to the maximum scan time (e.g., MaxChannelTime of MLME-SCAN.request) for the channel, or a value related thereto. As 3rd option, the specific time may be set to a first time based on the minimum scan time for the channel (or, a value related thereto), and if there is a signal detection within the first time, the specific time may be extended to a second time based on the maximum scan time (or, a value related thereto). As 4th option, the specific time may be set to a first time based on the minimum scan time for the channel (or a value related thereto), and if a MAC frame responding to the probe request frame is received from another AP within the first time, the time may be extended to a second time based on the maximum scan time (or, a value related thereto). In the 3rd and 4th options, the second time is longer than the first time.

Figure 7:
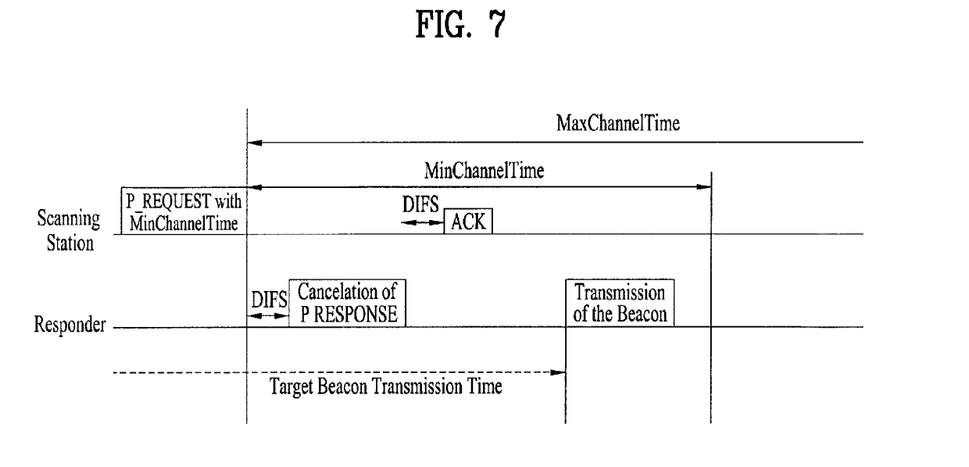
FIG. 7 shows an example of active scanning according to the present invention.

FIG. 7 shows an example of active scanning according to the present invention.

With reference to FIG. 7, when performing an active scanning, an STA may include a MinChannelTime parameter (or, a value related thereto) in a Probe Request frame to inform an AP of when the STA is available to receive a Probe Response frame or a Beacon frame. After receiving the MinChannelTime parameter via the Probe Request frame, the AP may check whether Target Beacon Transmission Time (TBTT) occurs within MinChannelTime from a starting time (e.g., a Probe Request frame reception time). If the TBTT occurs within the MinChannelTime, the AP may omit Probe Response transmission and send the Beacon frame on the TBTT. Otherwise, the AP may send the Probe Response frame in response to the Probe Request frame.

Meanwhile, in FIG. 7, the STA may further include a MaxChannelTime parameter (or, a value related thereto) in the Probe Request frame. In this case, if the AP receives any MAC frame(s) (e.g., Probe Response frame(s)) within STA's MinChannelTime, the AP may check whether the TBTT occurs within STA's MaxChannelTime. The MAC frame(s) may be limited to MAC frame(s) responding to the Probe Request frame. The AP may omit a Probe Response transmission when the TBTT occurs within STA's MaxChannelTime and send the Beacon frame on the TBTT. Otherwise, the AP may send the Probe Response frame in response to the Probe Request frame.

As an another example, when performing an active scanning, an STA may include a MaxChannelTime parameter (or, a value related thereto) in a Probe Request frame to inform an AP of when the STA is available to receive a Probe Response frame or a Beacon frame. In this case, after receiving the MaxChannelTime parameter via the Probe Request frame, the AP may check whether TBTT occurs within MaxChannelTime from a starting time (e.g., a Probe Request frame reception time). If the TBTT occurs within the MaxChannelTime, the AP may omit a Probe Response transmission and send a Beacon frame on the TBTT. Otherwise, the AP may send a Probe Response frame in response to the Probe Request frame.

As an another example, when performing an active scanning, an STA may include a Probe Response Omission Interval in a Probe Request frame to inform an AP of when the STA is available to receive a Probe Response frame or a Beacon frame. The value of the Probe Response Omission Interval may be same as the MinChannelTime primitive or the MaxChannelTime primitive. Or, the value of Probe Response Omission Interval may be different from the MinChannelTime primitive or the MaxChannelTime primitive. In this case, after receiving the Probe Response Omission Interval via the Probe Request frame, the AP may check whether TBTT occurs within the Probe Response Omission Interval from a starting time (e.g., a Probe Request frame reception time). If the TBTT occurs within the Probe Response Omission Interval, the AP may omit a Probe Response transmission and send a Beacon frame on TBTT occurrence. Otherwise, AP may send a Probe Response frame in response to the Probe Request frame.

Figure 8:
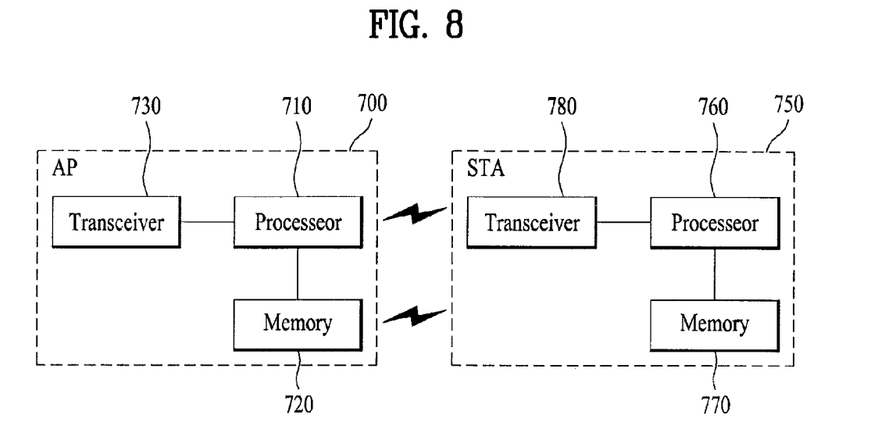
FIG. 8 is a schematic block diagram of wireless apparatuses implementing an exemplary embodiment of the present invention.

FIG. 8 is a schematic block diagram of wireless apparatuses implementing an exemplary embodiment of the present invention. An AP 700 includes a processor 710, a memory 720, a transceiver 730, and a STA 750 includes a processor 760, a memory 770, and a transceiver 780. The transceivers 730 and 780 transmit/receive a radio signal and implement an IEEE 802.11 physical layer. The processors 710 and 760 are connected with the transceivers 730 and 760 to implement an IEEE 802.11 MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between an AP and an STA. A specific operation which has been described as being performed by the AP may be performed by an upper node of the AP as the case may be. In other words, it will be apparent that various operations performed for communication with the STA in the network which includes a plurality of network nodes along with the AP can be performed by the AP or network nodes other than the AP. The term AP may be replaced with terms such as fixed station, Node B, eNode B (eNB), and Base Station (BS). Also, the term STA may be replaced with terms such as Mobile Station (MS), mobile terminal, Mobile Subscriber Station (MSS), and a User Equipment (UE).

The embodiments according to the present invention can be implemented by various means, for example, hardware, firmware, software, or combinations thereof. If the embodiment according to the present invention is implemented by hardware, the embodiment of the present invention can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used for a method, a wireless device, a base station, a relay in a wireless communication system.

The invention claimed is:

1. A method of performing a procedure for link-setup at an AP (access point) in a wireless communication system, the method comprising:
   receiving, from a UE (User Equipment), a probe request frame including time information via a channel, wherein the time information indicates at least a minimum scan time of the UE for the channel or a maximum scan time of the UE for the channel;
   determining whether a beacon transmission time of the AP occurs within a time based on the time information;
   transmitting, to the UE, a beacon frame instead of a probe response when the beacon transmission time occurs within the time; and
   transmitting, to the UE, a probe response when the beacon transmission time does not occur within the time.

2. The method of claim 1, wherein the time is a minimum scan time of the UE for the channel.

3. The method of claim 1, wherein the time is a maximum scan time of the UE for the channel.

4. The method of claim 1, wherein:
   the time is a first time based on the minimum scan time of the UE for the channel; and
   if there is a signal detection within the first time, the time is extended to a second time longer than the first time based on the maximum scan time of the UE for the channel.

5. The method of claim 1, wherein:
   the time is a first time based on the minimum scan time of the UE for the channel; and
   if a medium access control (MAC) frame responding to the probe request frame is received from another access point within the first time, the time is extended to a second time longer than the first time based on the maximum scan time of the UE for the channel.

6. An AP (access point) for performing a procedure for link-setup in a wireless communication system, the AP comprising:
   a radio frequency unit; and
   a processor configured to:
   receive, from a UE (User Equipment), a probe request frame including time information via a channel, wherein the time information indicates at least a minimum scan time of the UE for the channel or a maximum scan time of the UE for the channel;
   determine whether a beacon transmission time of the AP occurs within a time based on the time information;
   transmit, to the UE, a beacon frame instead of a probe response where the beacon transmission time occurs within the time; and
   transmit, to the UE, a probe response when the beacon transmission time does not occur within the time.

7. The AP of claim 6, wherein the time is a minimum scan time of the AP for the channel.

8. The AP of claim 6, wherein the time a maximum scan time of the UE for the channel.

9. The AP of claim 6, wherein:
   the time is a first time based on the minimum scan time of the UE for the channel, and
   if there is a signal detection within the first time, the time is extended to a second time longer than the first time based on the maximum scan time of the UE for the channel.

10. The AP of claim 6, wherein:
    the time is a first time based on the minimum scan time of the UE for the channel, and
    if a medium access control (MAC) frame responding to the probe request frame is received from another access point within the first time, the time is extended to a second time longer than the first time based on the maximum scan time of the UE for the channel.

* * * * *